Aug. 8, 1961 P. H. SHERRON 2,995,221

GROUP INSTALLATION TELEPHONE BOOTH STRUCTURE

Filed Nov. 24, 1958 2 Sheets-Sheet 1

INVENTOR.
PERCIVAL H. SHERRON
BY
Brown, Smith & Harding
ATTORNEYS

GROUP INSTALLATION TELEPHONE BOOTH STRUCTURE

Filed Nov. 24, 1958 2 Sheets-Sheet 2

INVENTOR.
PERCIVAL H. SHERRON
BY
Duncan, Smith & Harding
ATTORNEYS

United States Patent Office 2,995,221

Patented Aug. 8, 1961

2,995,221

GROUP INSTALLATION TELEPHONE BOOTH STRUCTURE

Percival H. Sherron, Jamaica, N.Y.
(% Sherron Metallic Corp., 1201 Flushing Ave., Brooklyn 37, N.Y.)

Filed Nov. 24, 1958, Ser. No. 775,931
3 Claims. (Cl. 189—2)

This invention relates to a group installation telephone booth structure and, more particularly, to structure involving a plurality of individual telephone booths mounted in adjacent side-by-side relation and incorporating structural arrangements providing closure between adjacent booths and the elimination of visible space between the booths wherein there may accumulate unsightly collections of dirt and foreign material.

Telephone booths as conventionally manufactured are provided with glass or otherwise transparent side panels serving to admit light into the booth and to make an occupant visible from the exterior of the booth. In most modern installations involving a plurality of booths in side-by-side relation this type of booth is employed.

In some cases these group installations are recessed in a building alcove so that only the front surfaces of the booths are visible. In other installations the booths are set in adjacent positions in a convenient place in a large room such as, for example, a railroad station, the lobby of a public building and the like, in which the space above the booths is open. In all of these installations, however, dirt, dust and foreign matter, such as empty cigarette wrappers and other papers, inevitably accumulate in the small space existing between adjacent booths. This space can be cleaned only with great difficulty and thus becomes undesirably unsightly.

It is accordingly an object of this invention to provide closure of this space in such a manner as to restrict or substantially prevent the accumulation of foreign matter therein and, further, to make this space invisible.

An additional undesirable occurrence in group telephone booth installations of this type is the accumulation of dirt, dust and foreign matter on adjacent surfaces of the glass side panels of adjacent booths. Merely closing off the space between the booths will not eliminate this undesirable condition.

It is accordingly a further object of the invention to provide means whereby in a pair of adjacently positioned booths only one of the adjacent sides of the booths is provided with glass panels and means as provided in the other of the adjacent pair of booths for closing off the panel receiving means therein and covering the space between the booths, thus, both sides of the single panel positioned between a pair of booths is accessible for cleaning and there exists no visible space in which foreign matter may collect.

These and other objects of the invention relating particularly to the construction thereof will become evident from the following description when read in conjunction with the accompanying drawings in which.

Figures 1, 3, 5:
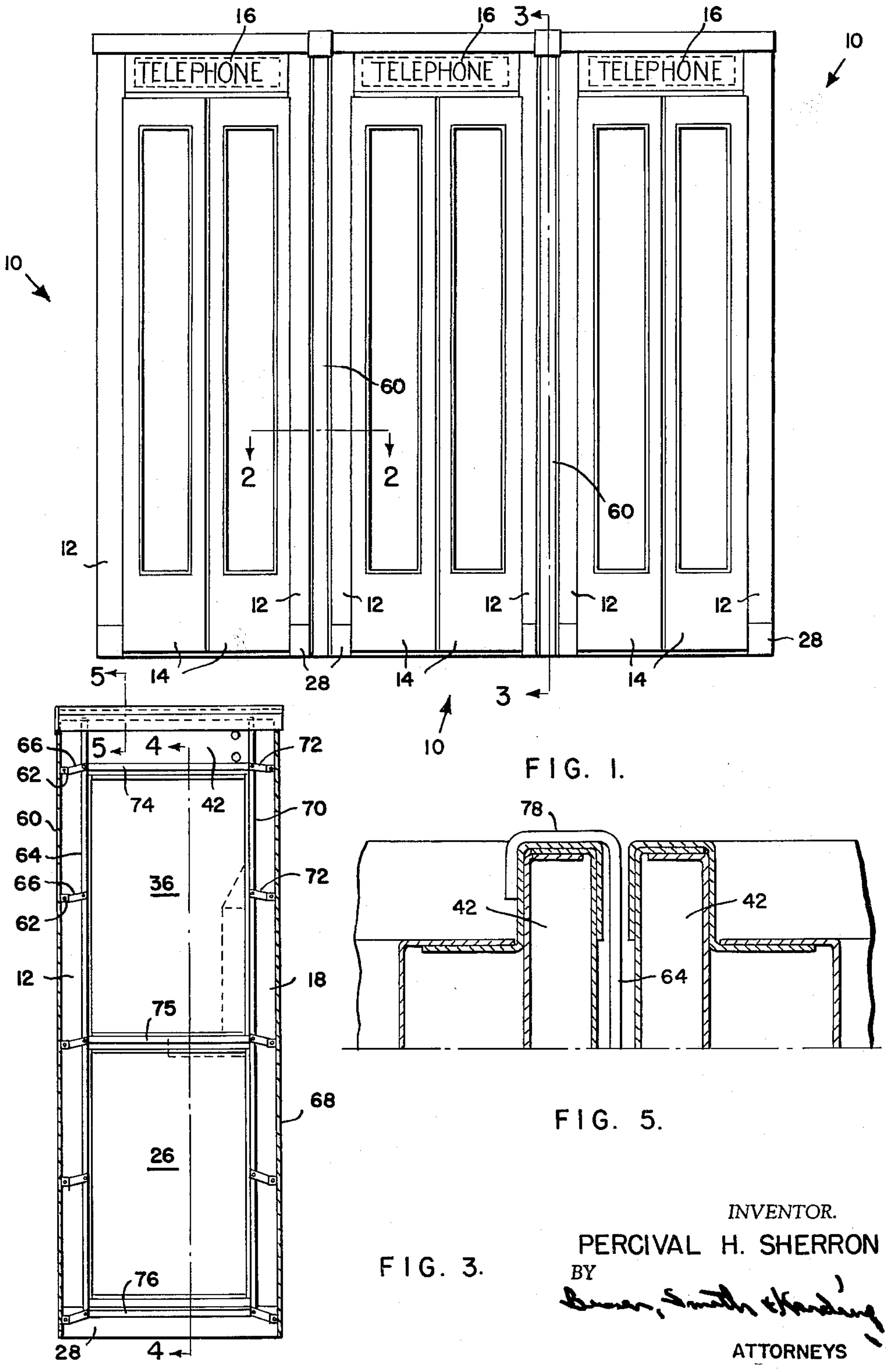
FIGURE 1 is a front elevation of a plurality of booths positioned in side-by-side arrangement providing a group installation of telephone booths.
FIGURE 3 is a vertical section taken between adjacent booths as indicated at 3—3 in FIGURE 1.
FIGURE 5 is a fragmentary vertical section taken through the uppermost end portions of the side walls of adjacent booths.

In FIGURE 1 there is shown three telephone booths in side-by-side relation, each indicated generally by the numeral 10. Except as will be hereinafter described, it is not necessary for the purpose of this disclosure to set forth the booth structure in detail. The structure being of the general type disclosed in my prior Patent No. 2,614,664 issued October 21, 1952.

As viewed from the front thereof, each of the booths includes a pair of front corner posts 12 and a pair of doors 14 mounted therebetween. Above the doors there is provided a lintel panel 16 bearing the word "Telephone."

Each of the booths also includes a pair of rear corner posts. The two adjacent rear corner posts of a pair of adjacent booths are shown at 18 in FIGURE 2. The front and rear corner posts of the booth are formed to provide a recess forming channel 20 within which is positioned a channel forming retaining structure 22 for the reception of a rubber molding 24 supporting a glass panel 26 extending between the front and rear corner posts of the booth as is shown at the left sides of FIGURES 2 and 4.

Each of the booths is also provided with a base structure 28 supporting the corner posts 12 and 18. A horizontally extending channel 30 having up-turned legs is positioned on an inwardly turned flange 32 of the top of the base 28 of each of the booths extending between the front and rear corner posts of each of the booths. A channel forming retaining structure 31 is positioned in the channel 30 and is adapted to receive a rubber molding 34 in which is positioned the lower edge of the glass panel 26 as is shown in the left sides of FIGURES 2 and 4.

The sides of the booths are constructed to receive two glass panels, one above the other. The lowermost of these panels is the panel 26 and the upper panel is indicated 36 in FIGURES 3 and 4. A horizontally extending double channel forming structure indicated generally at 38 extends between the corner posts 12 and 18 and between the glass panels 26 and 36 and mounts in each channel thereof a channel forming retaining structure 39 adapted to receive a molding 34 in which the glass panels 26 and 36 respectively are retained as shown in FIGURE 3 and in the left side of FIGURE 4.

The uppermost edge of the glass panel 36 is positioned in a molding 34 which is seated in a channel forming retaining structure 40 which is, in turn, mounted in a channel forming member 41 supported by a lintel structure 42 extending between and supported by the front and rear posts of the booth.

Figure 4:
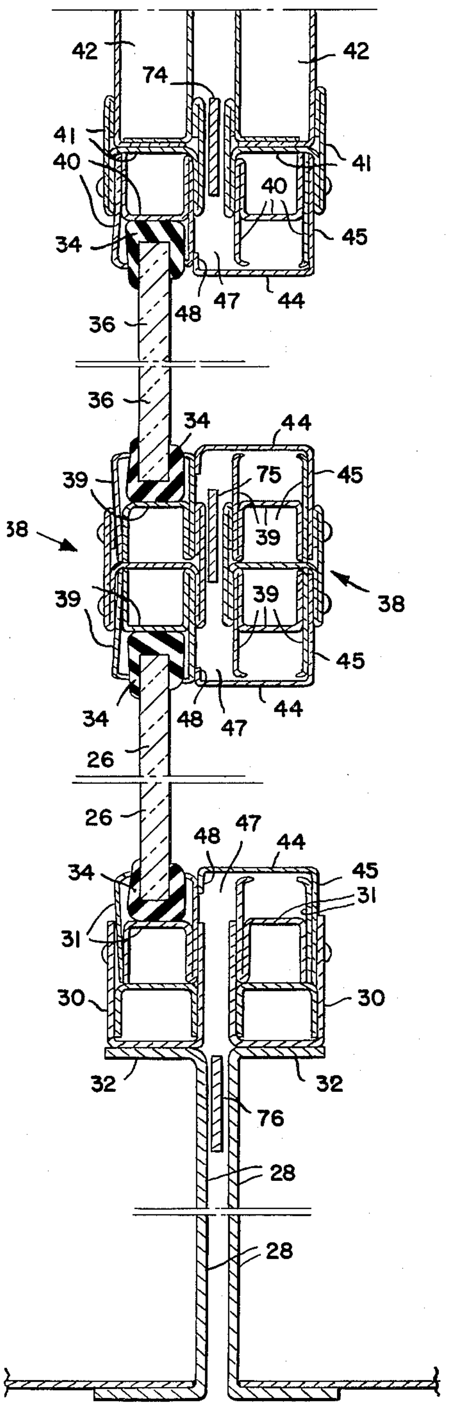
FIGURE 4 is a fragmentary vertical section taken through the side walls of adjacent booths.
Figure 2:
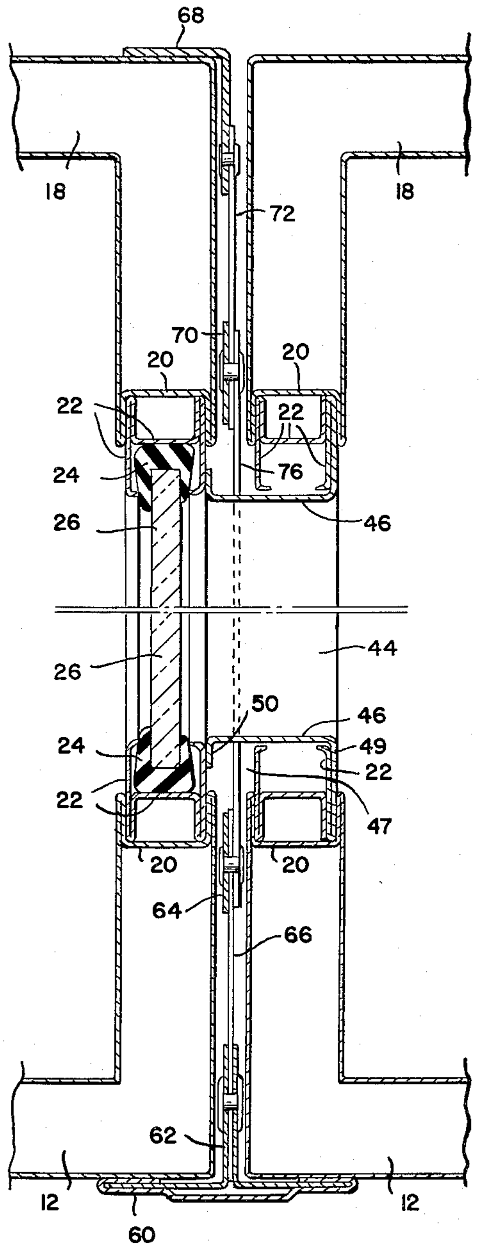
FIGURE 2 is a fragmentary horizontal transverse section taken through adjacent side walls of a pair of booths as indicated at 2—2 in FIGURE 1.

While the structures of each of the booths are adapted to receive moldings 24 and 34 and glass panels 26 and 36, only the side of one of an adjacent pair of booths is actually provided with these moldings and panels. As is shown in FIGURES 2 and 4, the other of the sides of adjacent booths is not provided with glass panels and panel receiving moldings. In place thereof horizontally extending closure moldings 44 are mounted in the channel forming structures 30, 38 and 41 and vertically extending closure moldings 46 are mounted in the vertically extending channel forming structures 22.

Each of the closure moldings 44 is provided with a first flange 45 positioned between the channel forming structures 30, 38 and 41, respectively, and the molding retaining structures 31, 39 and 40, respectively, thereon. At right angles to this flange is the flange indicated by the numeral 44 which extends over and closes off the retaining structure and the space 47 between the booths. The other edge of this flange terminates in a flange 48 lying parallel to the flange 45 and extending in the same direction therewith. The length of the flange 44 is such that the flange 48 bears against the panel molding retaining structure 39 of the adjacent booth. Similarly the closure moldings 46 are provided with flanges 49 positioned between the channel forming portion 20 of the corner posts and the retaining structures 22 therein. The other ends of the flanges 46 terminate in flanges 50 which engage the retaining structure 22 mounted in the adjacent corner posts supporting the rubber molding 24 within which the glass panels are positioned.

It will be evident that the closure moldings 44 and 46 serve to close off the space between the booths and to render this space inaccessible and invisible from the interior of either of a pair of adjacent booths. Furthermore, the arrangement provides only a single glass panel between adjacent booths and thus there is eliminated the chamber heretofore existing between the glass panels in each of adjacent booths providing a space for the collection of dust, dirt and foreign matter which presented an extremely unsightly appearance and was difficult to clean.

In order to close off the space between adjacent booths as viewed from the front thereof, a vertically extending closure member 60 is positioned in engagement with adjacent portions of the front surfaces of adjacent front corner posts 12. The vertically extending member 60 extends for the height of the booth and gives the group of booths the appearance, when viewed from the front thereof, as representing a single structure rather than as being a plurality of individual structures.

The member 60 has a plurality of tabs 62 affixed to the rear side thereof and positioned in the space between the adjacent corner posts of the booth. A vertically extending strap 64 is connected to the tabs 62 by means of short links 66. The links are pivotally connected to the tabs 62 and to the strap 64 and are of such a length as to position the strap 64 between adjacent corner posts.

A vertically extending angle member 68 is positioned with one flange in engagement with the rear face of one of adjacent rear corner posts as viewed in FIGURE 2 and extends for substantially the height of the booth. The other flange of the angle member 68 extends between the rear corner posts of the adjacent booths. A vertically extending strap 70 is connected to the inwardly turned flange of the angle member 68 by links 72. The links 72 are pivotally connected to the flange of the angle member 68 and to the strap 70, the links being of such a length as to position the strap between adjacent corner posts.

The vertically extending straps 64 and 70 are connected by transversely extending straps 74, 75 and 76. The uppermost transversely extending straps 74 is positioned at approximately the lower level of the upper lintel panels 42. The lowermost strap 76 is positioned between adjacent base structures, and the intermediate horizontal strap 75 is positioned between the horizontal extending channel forming structure 38 positioned between the upper and lower glass panels 36 and 26, respectively. Thus, the horizontally extending straps are not visible either from the front or from the interiors of the booths. The arrangement is such that when the vertically extending straps 64 and 75 are raised upwardly the links 66 and 72 will be inclined shortening the horizontal distance between the front and rear vertically extending members 60 and 68, respectively, thus, drawing these two members inwardly and securing the front vertically extending member 60 in firm engagement with one of the booths. It will be evident that by properly positioning the adjacent booth it will also be in firm engagement with the vertically extending member 60 as shown in FIGURE 2.

After the vertically extending straps 64 and 70 have been drawn upwardly to the limit of their travel as restricted by the vertically extending members 60 and 68 engaging the front and rear corner posts respectively, the upper ends of the straps 64 and 70 may be bent over the top of the booth as indicated at 78 in FIGURE 5 and thus retained in its uppermost position retaining the vertically extending members 60 and 68 in firm engagement with the booth.

It will be evident that in place of the angle member 68 there may be employed a T-shaped member similar to the member 60 if it is desired to completely close off the space between the booths at the rear of the booths, and top closure means may be provided if it is desired to close off the space between the booths at the tops thereof. It will also be evident that the structure disclosed herein involving a group of telephone booths each normally adapted to form an individual telephne booth and in which the side wall of one of each pair of adjacent booth side walls is modified by the removal of the glass side panels and the insertion of closure moldings and in which a front closure molding closes off the space between the booths provides a group booth installation in which the booths have a neat clean appearance and in which the problem of cleaning the space between the booths and cleaning the adjacent side wall surfaces of adjacent glass booth side panels is completely eliminated. It should be particularly noted that the structure disclosed herein provides front closure of the space between the booths and possible rear closure of this space in conjunction with the removal of the glass side panels from one of a pair of adjacent booths and that this is accomplished without the provision of exposed means for securing the front closure means to the booths.

What is claimed is:

1. In a group installation telephone booth structure, the combination comprising a first and a second telephone booth positioned with a wall of said first booth and a wall of said second booth in side-by-side close spaced relation, means providing deep channels in the narrow edges of marginal areas of said walls defining large opposed openings in said walls identical in size and shape, a panel positioned in the opening in the first booth wall, coacting panel retaining plate members extending about said panel, wedged between the side walls of the associated channel and extending a substantial distance from the channel toward the center of said panel for clamping the marginal areas of said panel therebetween, and coacting plate members lining the opening in the second booth wall and wedged between the side walls of the associated channel, one of the last-mentioned members being turned over the other and toward said panel for abutting one of the plate members coacting to retain said panel.

2. In a group installation telephone booth structure, the combination comprising a first and a second telephone booth positioned with a wall of said first booth and a wall of said second booth in side-by-side close spaced relation, means providing deep channels in the narrow edges of marginal areas of said walls defining a plurality of large openings in each of said walls, each opening in either of said walls being opposed to an opening in the other wall, and being identical thereto in size and shape, a panel positioned in each opening in the first booth wall, coacting panel retaining plate members extending about each of said panels, the plate members associated with each panel being wedged between the side walls of the associated channel, and being extended a substantial distance from the channel toward the center of the panel for clamping the marginal areas of the panel therebetween, and coacting plate members lining each opening in the second booth wall, the plate members associated with each opening being wedged between the side walls of the associated channel, and one of the last-mentioned members being turned over the other and toward the opposed panel for abutting one of the plate members coacting to retain said panel.

3. In a group installation telephone booth structure, the combination comprising a first and a second telephone booth positioned with a wall of said first booth and a wall of said second booth in side-by-side close spaced relation, means providing deep channels in the narrow edges of marginal areas of said walls defining a plurality of large openings in each of said walls, each opening in either of said walls being opposed to an opening in the other wall, and being identical thereto in size and shape, a panel positioned in each opening in the first booth wall, coacting panel retaining plate members extending about each of said panels, the plate members associated with each panel being wedged between the side walls of the associated channel, and being extended a substantial distance from the channel toward the center of the panel for clamping the marginal areas of the panel therebetween, coacting plate members lining each opening in the second booth wall, the plate members associated with each opening being wedged between the side walls of the associated channel, and one of the last-mentioned members being turned over the other and toward the opposed panel for abutting one of the plate members coacting to retain said panel, the turned over members associated respectively with each successive pair of openings in the second booth wall being provided with opposed sections defining a horizontally extending passage between said booth walls, and means for coupling said booths together including a plurality of vertically spaced horizontally extending members between said booth walls, one of the last-mentioned members being disposed in each of said passages and being thereby concealed from view.

References Cited in the file of this patent

UNITED STATES PATENTS

| | | |
|---|---|---|
| 1,885,432 | Gullicksen | Nov. 1, 1932 |
| 2,247,340 | Webster | June 24, 1941 |
| 2,371,968 | Lum | Mar. 20, 1945 |
| 2,576,409 | Michaelis et al. | Nov. 27, 1951 |
| 2,644,203 | Donahue | July 7, 1953 |